ated, and the section above the holder has
UNITED STATES PATENT OFFICE.

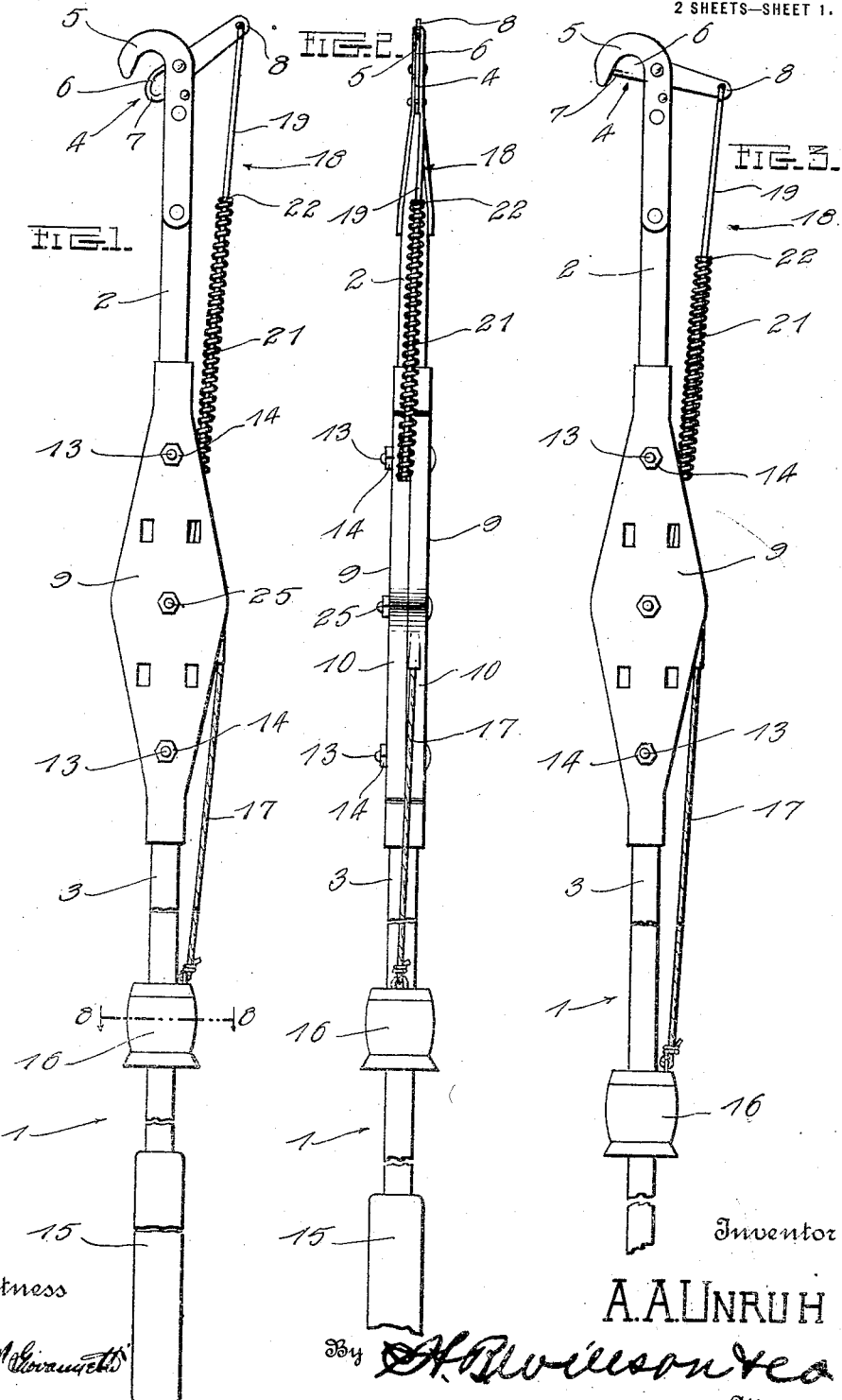

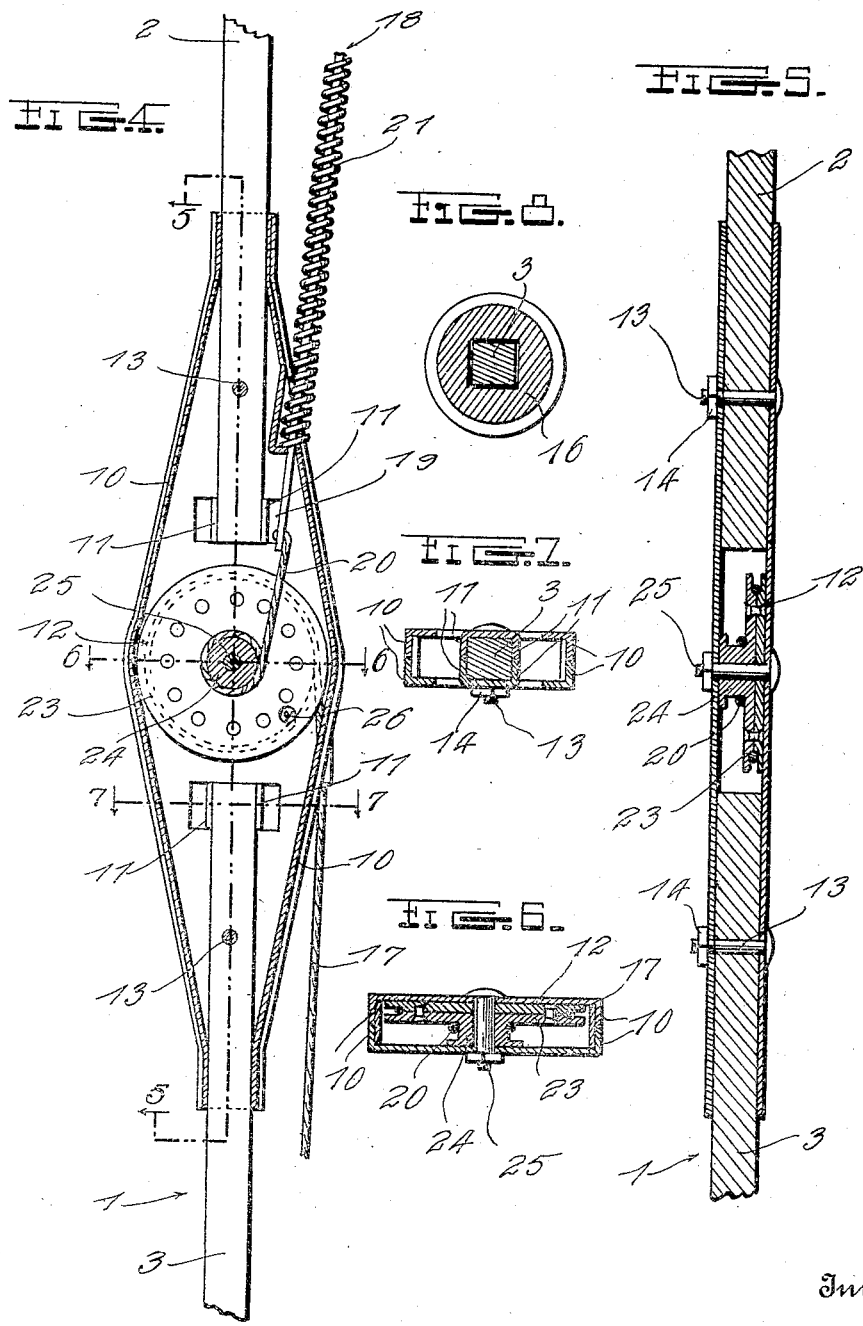

ALBERT ATWOOD UNRUH, OF PORTLAND, OREGON, ASSIGNOR OF ONE-THIRD TO R. W. FAIRFOULL, OF PORTLAND, OREGON, AND ONE-THIRD TO B. A. PARISH, OF CASTLE ROCK, WASHINGTON.

PRUNING IMPLEMENT.

1,246,685.  Specification of Letters Patent.  Patented Nov. 13, 1917.

Application filed February 21, 1917. Serial No. 150,213.

*To all whom it may concern:*

Be it known that I, ALBERT A. UNRUH, a citizen of the United States, residing at Portland, in the county of Multnomah and State of Oregon, have invented certain new and useful Improvements in Pruning Implements; and I do declare the following to be a full, clear, and exact description of the invention, such as will enable others skilled in the art to which it appertains to make and use the same.

This invention relates to new and useful improvements in pruning implements, and has particular reference to implements of this character especially adaptable for trimming trees and the like.

The primary object of the invention is to provide a pruning implement including a handle, carrying a cutter at the top thereof, which comprises a stationary jaw and a movable jaw, the movable jaw being operable from the lower end of the handle, and a leverage increasing device being interposed in the operating means, whereby a strong, steady pull is imparted to the movable jaw throughout its entire movement.

Another object of the invention is to provide a device of this character which is simple and durable in construction, inexpensive to manufacture, and one which will be very efficient in operation.

With these and numerous other objects in view, my invention consists of the novel features of construction, combination and arrangement of parts which will be herein referred to and more particularly pointed out in the specification and claims.

In the accompanying drawings:—

Figure 1 is a side elevation of the pruning implement in open position;

Fig. 2 is an end elevation;

Fig. 3 is a view similar to Fig. 1, showing the jaws closed;

Fig. 4 is a vertical section through the central portion or casing of the implement;

Fig. 5 is a vertical transverse section taken on the line 5—5 of Fig. 4;

Fig. 6 is a horizontal transverse section taken on the line 6—6 of Fig. 4;

Fig. 7 is a similar sectional view taken on the line 7—7 of Fig. 4;

Fig. 8 is a horizontal section taken on the line 8—8 of Fig. 1.

In describing my invention, I shall refer to the drawings in which similar reference characters designate corresponding parts throughout the several views. The numeral 1 designates the handle of my pruning implement, which is formed in two sections, comprising an upper section 2 and a lower section 3. These sections may be formed of any desired material, and are of sufficient length to reach up into the trees a considerable distance.

On the upper end of the upper section 2 is mounted a cutter 4 which comprises a stationary hook-shaped jaw 5, and a movable jaw 6 pivotally connected with the stationary jaw, and having a cutting edge 7 adapted to coact therewith as clearly shown in Figs. 1 and 3 of the drawings. This movable jaw has one portion thereof 8 extending laterally from the section and adapted to be connected with the operating means of this implement at its outer end.

The sections 2 and 3 of the handle 1 are connected by a casing 9 which is formed of two side sections with bent edges 10 adapted to engage each other, and to securely hold the adjacent ends of the sections therebetween. When the side sections of the casing 9 are assembled, the opposite ends of the same will be opened, and the adjacent ends of the sections are positioned therein as clearly shown in Fig. 4 of the drawings. To securely hold these ends of the sections in position, the sides of the casing are provided with upstruck shoulders 11 that are adapted to receive the ends of the sections therebetween.

The portion of the casing 9 that is disposed between the extremities of the adjacent sections of the handle is enlarged, and is adapted to receive therein a leverage increasing device 12. The two sections of the casing 9 are held into engagement with each other, and the ends of the sections secured therebetween by means of removable fastening members 13 which preferably comprise bolts extending through alining apertures in these parts and securely held in position by locking nuts 14 and their outer ends.

The lower end of the lower section 3 of the handle 1 is enlarged to form a holder 15, which is grasped when the device is operated, and the section above the holder has mounted thereon a slide 16, which comprises the operating means employed in this implement. This slide is connected by a connecting member 17 with the leverage increasing device in the casing, and the member comprising in this instance a cable having its lower end connected to the slide 16 and its upper end extending through the side of the casing and connected to the leverage increasing device in the interior of the same. An additional connecting member 18 has one end secured to the projecting lever 8 of the movable jaw 6, and extends downwardly through one side of the casing 9, having its lower end connected with the leverage increasing device, in the interior of the casing. This connecting member 18 comprises a rod 19 that extends from the lever 8 into the casing 9, where a cable 20 is connected therewith, and has its lower end secured to the leverage increasing device. Surrounding the connecting member 18 outside of the casing is a coil spring 21, which has its lower end positioned on said casing, and its upper end held against a stop 22 on said member. This spring normally will hold the movable jaw 6 in open position.

The leverage increasing means employed in this device comprises a large wheel 23 and a small wheel 24 connected with each other and mounted on a single axis 25 that extends between the sides of the casing 9. The lower end 20 of the connecting member 18 surrounds and is secured to the periphery of the small wheel 24, while the upper end of the connecting member 17 partly surrounds and is connected to the large wheel 23. This large wheel is preferably formed in two sections, having the extremity of the connecting member 17 securèd therebetween as shown at 26.

From the foregoing description of the arrangement of the various parts employed in the construction of this pruning implement, the operation of this device will be easily seen. The movable jaw 6 of the cutter 4 is normally held in open position due to the tension of the coil spring 21, and this will so position the other parts of the device that the operating slide member 16 is disposed adjacent the top of the lower section 3 as clearly shown in Fig. 1 of the drawings. To operate the implement, it is only necessary to lower the slide member 16 whereupon, owing to the connection of the same with the leverage increasing device, the wheels 23 and 24 will be rotated, and the upper end of the connecting member 17 unwound from the large wheel 23 and the lower end of the connecting member 18 wound upon the smaller wheel 24. This will pull the rod 19 downwardly against the tension of the spring 21, consequently moving the lever 8 of the movable jaw 6, whereupon the cutting edge of the same is moved against the stationary jaw, and the cutter will be operated. The leverage increasing device 12 interposed between the two connecting members that operatively join the slide 16 and the cutter 4, will greatly increase the power of the movable jaw, and will, during the operation of the implement, pull the same steadily toward closed position. In other devices of this general character, the cutters lose power when they need it most, when cutting through a limb and passing the center, as the friction is greatest on the last half of the cut, but by the employment of the operating means described in this device, the power is equal throughout the movement of the movable jaw 6.

The operation of the large and small wheels through their connection with the members 17 and 18 tend to increase the leverage on the movable jaw, and consequently the power of the same. As soon as the slide 16 is released after the jaw has cut through a limb or the like, the coil spring will force the movable jaw back to open position, and the parts will automatically again assume the position shown in Fig. 1 of the drawings.

From the foregoing description of the construction and operation of my new and improved pruning implement, the manner of applying the same to use, and the operation thereof will be readily understood, and it will be seen that I have provided a simple and efficient device of this character for carrying out the objects of the invention.

I claim:—

1. A pruning implement of the class described comprising a handle formed of two sections, a casing connecting the ends of said sections in spaced relation, a cutter at the upper end of one section comprising a stationary jaw and a movable jaw, operating means mounted on the other section, a connecting member between the movable jaw and the interior of the casing, an additional connecting member extending from the operating means into the casing, a leverage increasing device mounted in said casing between said sections operatively connecting the adjacent ends of said members and a spring connection between one of said members and casing to normally retain the jaws of said cutter in spaced relation.

2. A pruning implement of the class described comprising a handle, a large wheel mounted on said handle intermediate its ends, a small wheel mounted on the same axis as the large wheel and connected with the same, a cutter on the upper end of said handle comprising a stationary jaw and a movable jaw, operating means on the lower end of said handle, a connecting member having one end secured to the movable jaw and its other to the outer surface of the smaller wheel, an additional connecting member between the operating means and the outer surface of the larger wheel, and a coil spring on said first mentioned connecting member to hold the movable jaw normally in open position.

3. A pruning implement of the class described comprising a handle formed of two sections, a casing connecting said sections, a cutter on the upper end of one section comprising a stationary jaw and a movable jaw, operating means slidably mounted on the other section, a large and a small wheel connected to each other and mounted on a single axis in the casing, a connection between the movable jaw and the small wheel, an additional connection between the slidable operating means and large wheel, and a coil spring surrounding a portion of the first mentioned connection outside of the casing to normally hold the movable jaw in open position.

4. A pruning implement of the class described comprising a casing formed of two sections, said casing having alining openings in its opposite ends to receive the ends of a two section handle therein, upstruck shoulders on the opposite sides of the casing to hold the ends of the sections therebetween, removable fastening members extending through the casing and the ends of the sections to hold the sections into engagement therewith, said casing having an enlarged central portion, a leverage increasing device therein, a cutter on one section of the handle comprising a stationary jaw and a movable jaw, a slidable operating member on the other section of the handle, and means connecting the movable jaw and the slidable member with the leverage increasing device in the casing.

In testimony whereof I have hereunto set my hand in the presence of two subscribing witnesses.

ALBERT ATWOOD UNRUH.

Witnesses:
OLIVER M. HICKEY,
R. W. FAIRFOULL.

Copies of this patent may be obtained for five cents each, by addressing the "Commissioner of Patents, Washington, D. C."